(12) United States Patent
Hurd et al.

(10) Patent No.: US 9,164,931 B2
(45) Date of Patent: Oct. 20, 2015

(54) CLAMPING OF DYNAMIC CAPACITANCE FOR GRAPHICS

(71) Applicant: Intel Corporation, Santa Clara, CA (US)

(72) Inventors: Linda L. Hurd, Cool, CA (US); Wenyin Fu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 13/631,921

(22) Filed: Sep. 29, 2012

(65) Prior Publication Data

US 2014/0092106 A1 Apr. 3, 2014

(51) Int. Cl.
*G06F 15/00* (2006.01)
*G06F 13/14* (2006.01)
*G06T 1/00* (2006.01)

(52) U.S. Cl.
CPC .. *G06F 13/14* (2013.01); *G06T 1/00* (2013.01)

(58) Field of Classification Search
None
See application file for complete search history.

(56) References Cited

U.S. PATENT DOCUMENTS

| | | | |
|---|---|---|---|
| 5,953,020 A | 9/1999 | Wang et al. | |
| 6,172,550 B1 * | 1/2001 | Gold et al. | 327/366 |
| 7,337,339 B1 | 2/2008 | Choquette et al. | |
| 7,386,737 B2 | 6/2008 | Finkelstein et al. | |
| 7,574,613 B2 | 8/2009 | Holle et al. | |
| 7,634,668 B2 | 12/2009 | White et al. | |
| 7,664,971 B2 | 2/2010 | Oh | |
| 7,882,369 B1 | 2/2011 | Kelleher et al. | |
| 7,886,164 B1 | 2/2011 | Alben et al. | |
| 8,099,618 B2 | 1/2012 | Vorbach et al. | |
| 8,193,831 B1 | 6/2012 | Kadosh et al. | |
| 8,214,663 B2 | 7/2012 | Floyd et al. | |
| 8,250,394 B2 | 8/2012 | Agrawal | |
| 8,335,941 B2 | 12/2012 | Chang et al. | |
| 8,539,269 B2 | 9/2013 | Rotem et al. | |
| 2001/0011356 A1 | 8/2001 | Lee et al. | |
| 2001/0029556 A1 | 10/2001 | Priem et al. | |
| 2002/0002077 A1 * | 1/2002 | Shimizu et al. | 463/30 |
| 2002/0019949 A1 | 2/2002 | Meynard | |

(Continued)

FOREIGN PATENT DOCUMENTS

WO 2013/101189 A1 7/2013
WO 2013/101829 A1 7/2013

OTHER PUBLICATIONS

Non-Final Office Action received for U.S. Appl. No. 13/077,618, mailed on Dec. 26, 2012, 7 pages.

(Continued)

*Primary Examiner* — Ke Xiao
*Assistant Examiner* — Kyle Zhai
(74) *Attorney, Agent, or Firm* — Alpine Technology Law Group LLC

(57) ABSTRACT

Methods and apparatus relating to clamping or reducing of dynamic capacitance for graphics logic are described. In one embodiment, utilization values for a plurality of subsystems of a graphics logic are determined and a first capacitance value is in turn determined based on (e.g., a sum of products of) the determined utilization values (e.g., and one or more capacitance weight values). A second capacitance value (e.g., corresponding to a maximum dynamic capacitance or Cdyn_max corresponding to the graphics logic) is modified based on (e.g., a comparison of the first capacitance value and a (e.g., threshold) capacitance value. Other embodiments are also disclosed and claimed.

26 Claims, 6 Drawing Sheets

(56) References Cited

U.S. PATENT DOCUMENTS

| | | |
|---|---|---|
| 2002/0169990 A1 | 11/2002 | Sherburne, Jr. |
| 2002/0178808 A1* | 12/2002 | Hafer .................... 73/304 C |
| 2003/0007394 A1 | 1/2003 | Phi et al. |
| 2003/0115428 A1 | 6/2003 | Zaccarin et al. |
| 2005/0154931 A1 | 7/2005 | Oh |
| 2005/0289377 A1 | 12/2005 | Luong et al. |
| 2006/0047987 A1 | 3/2006 | Prabhakaran et al. |
| 2006/0053326 A1 | 3/2006 | Naveh et al. |
| 2006/0069936 A1 | 3/2006 | Lint et al. |
| 2006/0161799 A1 | 7/2006 | Degenhardt |
| 2006/0259804 A1 | 11/2006 | Fry |
| 2007/0206683 A1 | 9/2007 | Lin |
| 2007/0208964 A1 | 9/2007 | Sandon et al. |
| 2007/0234075 A1 | 10/2007 | Zimmer et al. |
| 2007/0245165 A1 | 10/2007 | Fung |
| 2008/0001795 A1 | 1/2008 | Arabi et al. |
| 2008/0005592 A1 | 1/2008 | Allarey et al. |
| 2008/0235364 A1 | 9/2008 | Gorbatov et al. |
| 2008/0307248 A1 | 12/2008 | Amano et al. |
| 2009/0001814 A1 | 1/2009 | Subramaniam |
| 2009/0204830 A1 | 8/2009 | Frid et al. |
| 2009/0271141 A1 | 10/2009 | Coskun et al. |
| 2010/0082943 A1 | 4/2010 | Yamamoto |
| 2010/0115304 A1 | 5/2010 | Finkelstein et al. |
| 2010/0169692 A1 | 7/2010 | Burton |
| 2010/0218029 A1 | 8/2010 | Floyd et al. |
| 2010/0274938 A1 | 10/2010 | Anand et al. |
| 2011/0022871 A1 | 1/2011 | Bouvier et al. |
| 2011/0093724 A1 | 4/2011 | Park et al. |
| 2011/0099397 A1 | 4/2011 | Rotem et al. |
| 2011/0138388 A1 | 6/2011 | Wells et al. |
| 2011/0145617 A1 | 6/2011 | Thomson et al. |
| 2011/0154081 A1 | 6/2011 | Allarey |
| 2011/0154348 A1 | 6/2011 | Elnozahy et al. |
| 2011/0161627 A1 | 6/2011 | Song et al. |
| 2011/0173477 A1 | 7/2011 | Asaba |
| 2011/0238974 A1 | 9/2011 | Wells et al. |
| 2011/0267079 A1* | 11/2011 | Gecnuk .................... 324/658 |
| 2012/0110352 A1 | 5/2012 | Branover et al. |
| 2012/0166838 A1 | 6/2012 | Nasrullah et al. |
| 2012/0169746 A1 | 7/2012 | Samson |
| 2013/0007413 A1 | 1/2013 | Thomson et al. |
| 2013/0015904 A1 | 1/2013 | Priel et al. |
| 2013/0097443 A1 | 4/2013 | Li et al. |
| 2014/0002467 A1 | 1/2014 | Linda |
| 2014/0006838 A1 | 1/2014 | Linda |
| 2014/0085501 A1 | 3/2014 | Tran |
| 2014/0089699 A1 | 3/2014 | O'Connor et al. |
| 2014/0095906 A1 | 4/2014 | Hurd |
| 2014/0095912 A1 | 4/2014 | Hurd et al. |
| 2014/0245034 A1 | 8/2014 | Rotem et al. |

OTHER PUBLICATIONS

Notice of Allowance received for U.S. Appl. No. 13/077,618, mailed on May 30, 2013, 8 pages.

Non-Final Office Action received for U.S Appl. No. 13/340,129, mailed on Jun. 5, 2014, 15 pages.

Non-Final Office Action received for U.S Appl. No. 13/340,129, mailed on Dec. 13, 2013, 11 pages.

Non-Final Office Action received for U.S Appl. No. 13/539,411, mailed on Jul. 2, 2014, 21 pages.

Final Office Action received for U.S. Appl. No. 13/539,414 mailed on Nov. 10, 2014, 12 pages.

Non-Final Office Action received for U.S. Appl. No. 13/539,414, mailed on Jul. 16, 2014, 11 pages.

Non-Final Office Action received for U.S. Appl. No. 13/631,913, mailed on Nov. 7, 2014, 15 pages.

Non-Final Office Action received for U.S. Appl. No. 13/631,930, mailed on Dec. 4, 2014, 14 pages.

Hurd, Linda L., "Graphics Voltage Reduction for Load Line Optimization", U.S. Appl. No. 14/139,031, filed Dec. 23, 2013, 42 pages.

International Preliminary Report on Patentability and Written Opinion received for PCT Patent Application No. PCT/US2011/068120, mailed on Jul. 10, 2014, 6 pages.

International Search Report and Written Opinion received for PCT Patent Application No. PCT/US2011/068120, mailed on Sep. 21, 2012, 9 pages.

International Preliminary Report on Patentability and Written Opinion received for PCT Patent Application No. PCT/US2012/071653, mailed on Jul. 10, 2014, 7 pages.

International Search Report and Written Opinion received for PCT Patent Application No. PCT/US2012/071653, mailed on Apr. 29, 2013, 10 pages.

Notice of Allowance received for U.S. Appl. No. 13/340,129, mailed on Nov. 21, 2014, 11 pages.

* cited by examiner

CLAMPING OF DYNAMIC CAPACITANCE FOR GRAPHICS

FIELD

The present disclosure generally relates to the field of electronics. More particularly, an embodiment of the invention relates to clamping of dynamic capacitance for graphics logic.

BACKGROUND

The term maximum dynamic capacitance (Cdyn_max) generally refers to the maximum amount of dynamic capacitance for an integrated circuit component or package. When the term is used with reference to general-purpose CPUs (Central Processing Units), it may indicate a capability of sustaining the Cdyn_max over a relatively long period of time. However, graphics architecture is relatively more complex than general-purpose CPU architecture; for example, the maximum sustainable Cdyn (dynamic capacitance) for 1 μsec may be a different value than that for 100 μsec or 2 μsec based on the complexity of the different subsystems, latencies, and interactions between these subsystems. Accordingly, controlling the value of Cdyn_max may have a direct effect on power-efficiency and/or speed of graphics components.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
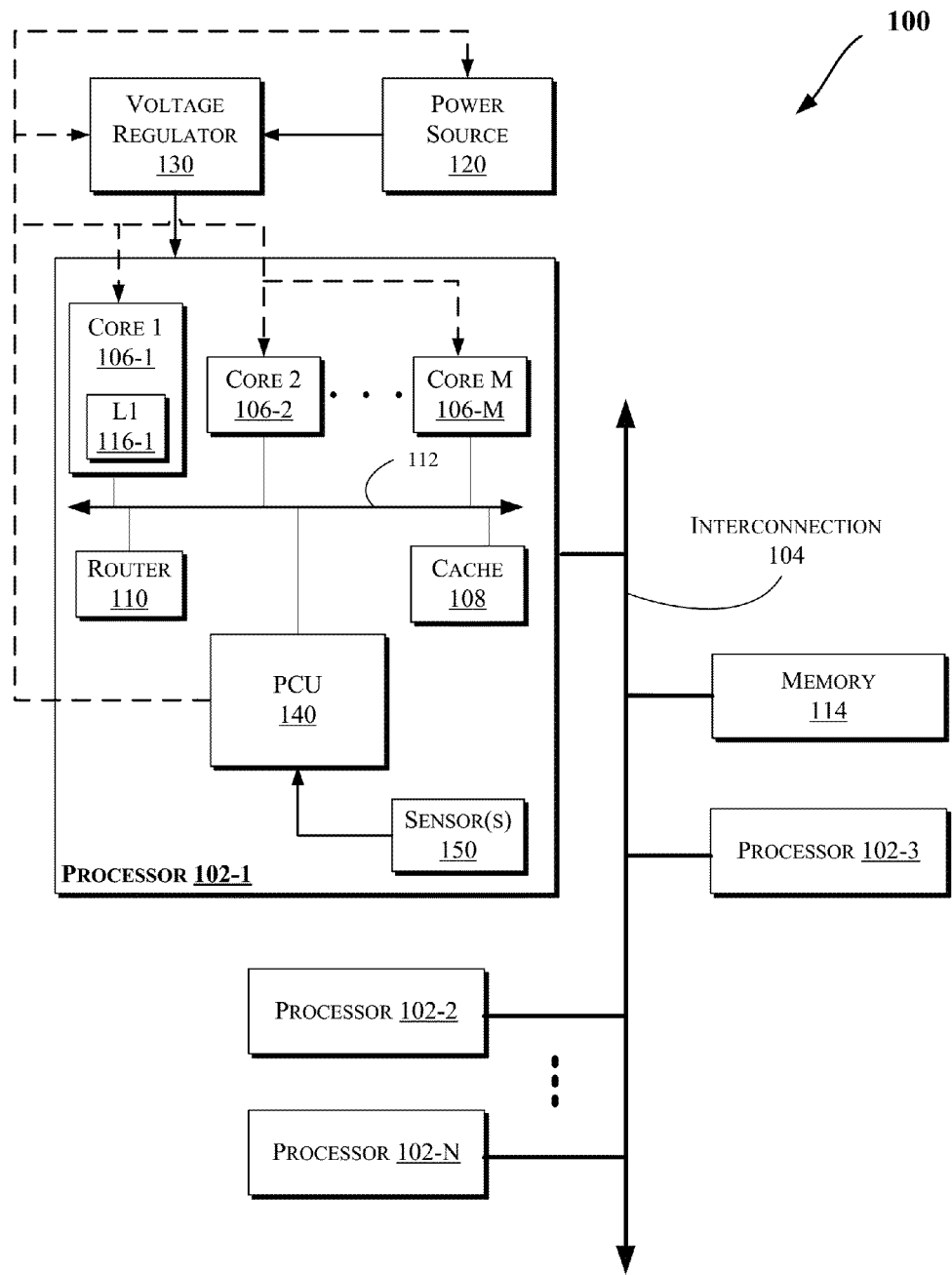
FIGS. 1, 6, and 7 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some embodiments provide clamping (or reduction) of maximum dynamic capacitance (Cdyn_max) for graphics logic. The graphics logic may include a GPU (Graphics Processing Unit) or other types of logic that perform computation(s) relating to graphics task(s), such as operation(s) that manipulate an image, frame, scene, etc., e.g., as will be further discussed here. Reduction of graphics Cdyn_max may be performed for any type of client computing device (such as a desktop computer, a laptop computer, a mobile device (such as a smart phone, tablet, etc.), a work station, etc.) and/or SOC (System On Chip) products.

Moreover, SOC products may have a higher load line impedance than client computing device due to the smaller form factors of SOC product designs. Client type ULT (Ultrabook) products that are constrained to a single phase VR (Voltage Regulator) design may also utilize some of the embodiments discussed herein. And, higher end computing devices, which may have multiple VR phases, could more efficiently use the package maximum operating current (Icc_max) during multi-core turbo when GT (graphics logic) needs to be active. Accordingly, some processor cores could potentially turbo to higher frequency with GT's Cdyn_max clamped.

As discussed herein, a turbo operation (also referred to as turbo boost) allows processor core(s) to run faster than the base operating frequency (for a period of time) if they are operating below power, current, and temperature specification limits. Moreover, as processor die (including for example a general-purpose CPU and a GPU) become larger (e.g., to include more functionality such as processing power, storage, etc.), more product SKUs (Stock Keeping Units) may become maximum operating current (Icc_max) limited during different turbo scenarios compared to previous designs, for example, depending on workload characteristics (and how those workloads are dynamically partitioned across multiple CPU cores and/or GPU cores) in those timeframes.

Some of the embodiments discussed herein may reduce the graphics Cdyn_max, for example, by one or more of: (a) graphics load line optimization (e.g., resulting in power savings); (b) graphics Icc_max reduction, (e.g., in package Icc_max scenarios); and/or (c) Icc_max reduction for FIVR (Fully Integrated Voltage Regulator), e.g., with respect to bump VR limits or die area consumed for bump area. Such implementations may in turn provide efficient and/or flexible power management for computing systems and/or processors, e.g., via a dynamically configurable graphics logic to optimize/maximize graphics (and/or general-purpose) processor core performance.

As discussed herein, an "EU" generally refers to a computational unit that is included in graphics logic. Also, more than one EU may be provided in each graphics logic, GPU, etc. Each EU may in turn include a plurality of (e.g., four) processing elements (such as ALUs (Arithmetic Logic Units), which may perform the role of shader processor(s)). Also, a sampler (also known as "3D Texture Sampler" sometimes) generally refers to logic for performing texture filtering (or smoothing) to determine the texture color for a texture-mapped-pixel using the colors of nearby texls (pixels of the texture). Moreover, the texturing process allows a texture to be applied at many different shapes, sizes, and angles, while minimizing blurriness, shimmering and blocking.

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 6 and/or 7, including for example a flat panel display device, etc.).

Some embodiments may be applied in computing systems that include one or more processors (e.g., with one or more processor cores), such as those discussed with reference to FIGS. 1-7, including for example mobile computing devices such as smart phones, tablets, portable game consoles, etc.). More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may be general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 6-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130 (which may be a single or multiple phase VR). In an embodiment, the VR 130 may be a FIVR (Fully Integrated Voltage Regulator). Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores). Power source may be capable of driving variable voltage or have different power drive configurations.

Additionally, while FIG. 1 illustrates the power source 120 and the voltage regulator 130 as separate components, the power source 120 and the voltage regulator 130 may be integrated and/or incorporated into other components of system 100. For example, all or portions of the VR 130 may be incorporated into the power source 120 and/or processor 102. Furthermore, as shown in FIG. 1, the power source 120 and/or the voltage regulator 130 may communicate with the power control logic 140 and report their power specification.

As shown in FIG. 1, the processor 102 may further include a Power Control Unit (PCU) logic 140 to control supply of power to components of the processor 102 (e.g., cores 106). Logic 140 may have access to one or more storage devices discussed herein (such as cache 108, L1 cache 116, memory 114, register(s), or another memory in system 100) to store information relating to operations of the PCU logic 140 such as information communicated with various components of system 100 as discussed here.

As shown, the logic 140 may be coupled to the VR 130 and/or other components of system 100 such as the cores 106 and/or the power source 120. For example, the PCU logic 140 may be coupled to receive information (e.g., in the form of one or more bits or signals) to indicate status of one or more sensors 150 (where the sensor(s) 150 may be located proximate to components of system 100 (or other computing systems discussed herein such as those discussed with reference to other figures including 6 and 7, for example), such as the cores 106, interconnections 104 or 112, etc., to sense variations in various factors affecting power/thermal behavior of the system, such as temperature, operating frequency, operating voltage, operating current, dynamic capacitance, power consumption, inter-core communication activity, etc.).

For example, the sensors 150 may detect whether one or more subsystems are active (e.g., as discussed with reference to FIGS. 2-7). The logic 140 may in turn instruct the VR 130, power source 120, and/or individual components of system 100 (such as the cores 106) to modify their operations. For example, logic 140 may indicate to the VR 130 and/or power source 120 to adjust their output. In some embodiments, logic 140 may request the cores 106 to modify their operating frequency, power consumption, dynamic capacitance, operating current, etc. Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc. Also, even though cores 106 are shown to be processor cores, these can be other computational element such as graphics cores, special function devices, etc.

In some embodiments, if a window for Cdyn_max is set to the maximum dynamic capacitance that the architecture is capable of generating across a specified time window (e.g., in the 200 nsec to 1 μsec range), Cdyn_max(Bin) is calculated based on: a sum of products of utilization value(s) of (e.g., major) subsystems*Cdyn_max weight values plus a baseline value. In various embodiments, the (major) subsystems include EUs (Execution Units), sampler logic/pipeline(s), and/or L3$ (Third Level cache). The remainder of the graphics logic may be modeled as a fixed component. A "bin" generally refers to a window based on the number of clock cycles, and Cdyn_max weights may be based on highest toggle and highest activity mode assumptions for the subsystem. For example, in the EU, the assumptions are based on a PLN (Plane) instruction (such as ax+by+c) with highest data toggle rate in data path and, in the sampler, both the main pipe and fetch path are considered active with highest toggle rate in the texl bus data paths.

In an embodiment, Cdyn_max(Bin) can only have the potential of achieving Cdyn_max if the utilizations of the major subsystems (discussed above) are all at 100%, e.g., for each clock cycle in the bin, all major subsystems are active and not stalled. In one embodiment, Cdyn_max clamping guarantees that Cdyn_max(Bin) does not exceed a specified percentage of Cdyn_max.

Figure 2:
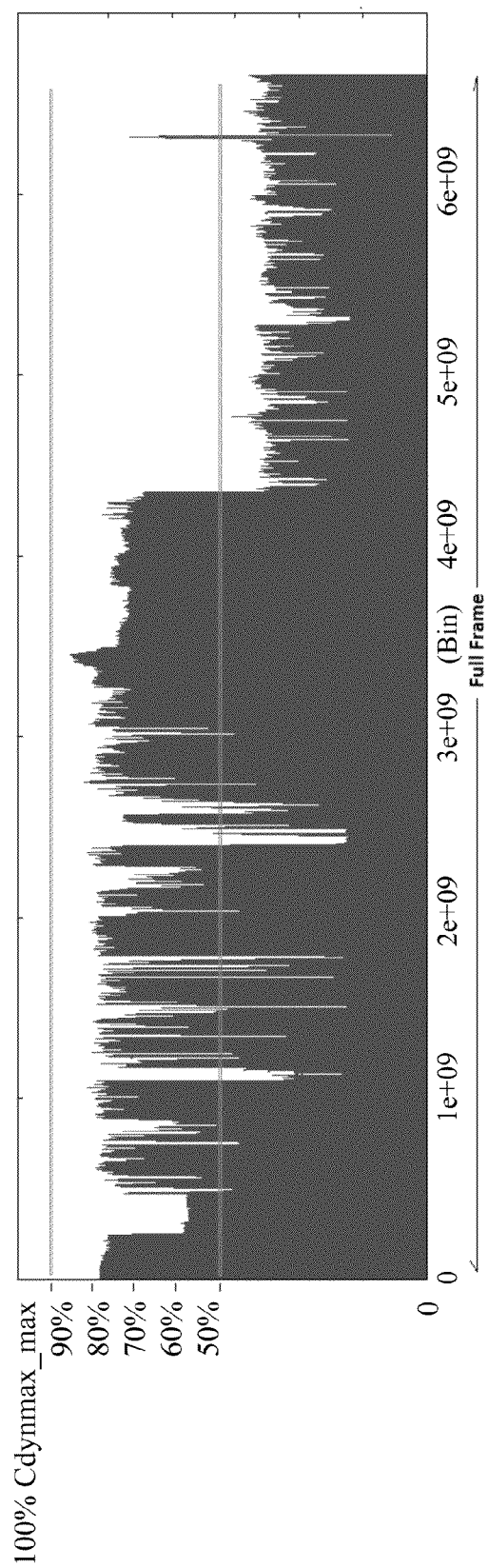
FIG. 2 illustrates a graph of percentage of maximum dynamic capacitance vs. bin values, according to an embodiment.

FIG. 2 illustrates a graph of percentage of maximum dynamic capacitance vs. bin values, according to an embodiment. In the example shown in FIG. 2, it is illustrated that setting the percentage of Cdyn-max to 90% would have no impact on the sample frame (e.g., all Cdyn_max(Bin) values are below 90%. Also, conversely, guaranteeing a 50% threshold would likely increase the number of clocks in the frame length.

Figure 3:
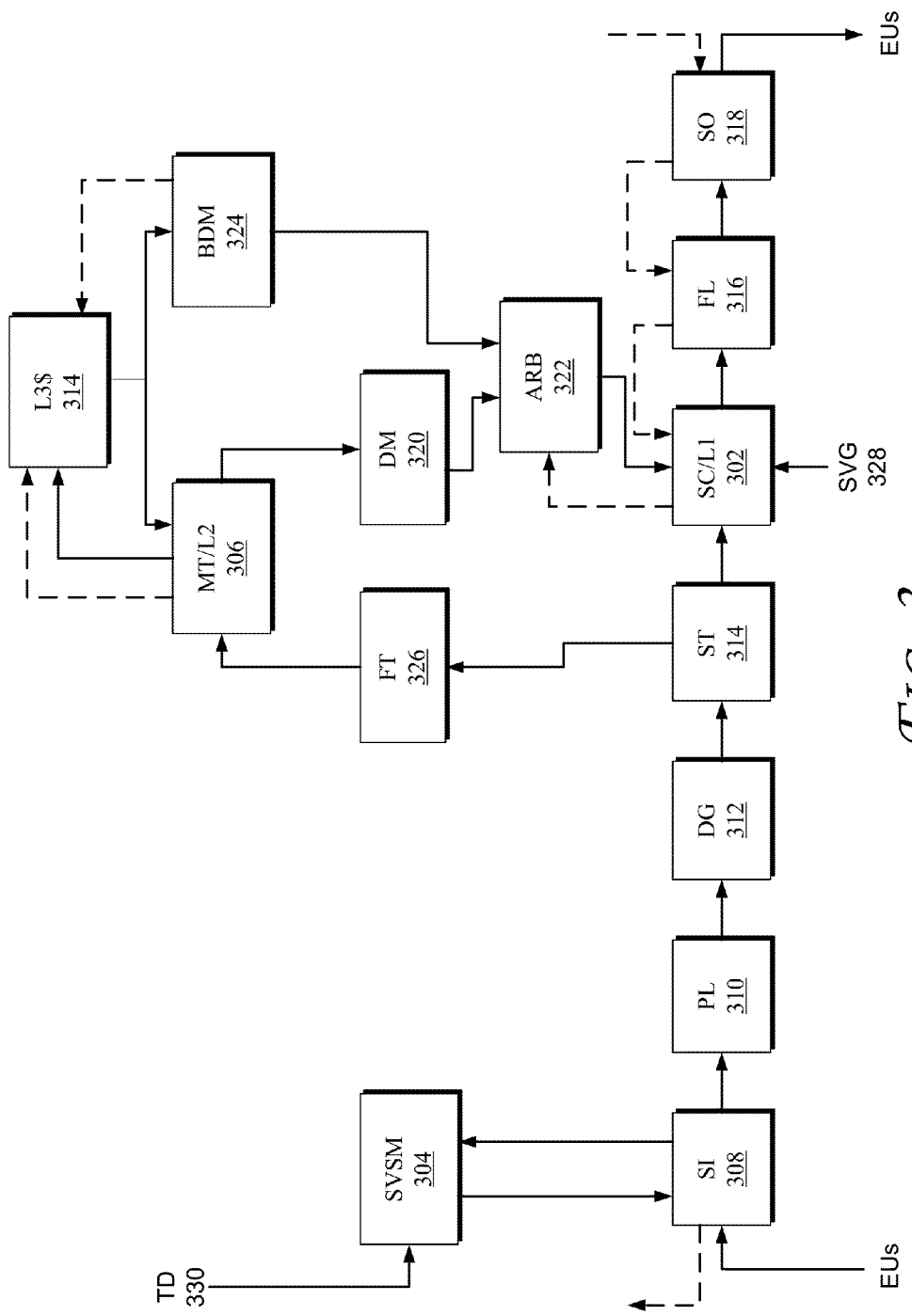
FIG. 3 illustrates a block diagram of components of a graphics logic or processor core in a GPU (Graphics Processing Unit), according to an embodiment.

FIG. 3 illustrates a block diagram of components of a graphics logic or processor core in a GPU, according to an embodiment. The direction of arrows in FIG. 3 illustrate sample direction of data flow in some embodiments. Also, in FIG. 3, SC 302 refers to a Slice Common logic, SVSM 304 refers to state variable sampler logic that receives dispatched threads and forwards them to other components of the graphics logic, MT 306 refers to second level texture cache, SI 308 refers to sampler input logic, PL 310 refers to projection and LOD (Level of Detail) logic, DG 312 refers to dependent address generator logic, ST 314 refers to sampler tag logic, L1 302 refers to first level cache, FL 316 refers to filter logic, SO 318 refers to sampler output logic, L2 306 refers to second level cache, DM 320 refers to de-compressor logic, ARB 322 refers to arbitrator logic (e.g., to arbitrate between outputting a value corresponding to the output of DM logic 320 or BDM 324 which refers to bypass DM logic), FT 326 refers to fetch logic, SVG 328 refers to state variable logic, and TD 330 refers to thread dispatch logic. In an embodiment, a SVSM MT adapter is present (not shown), e.g., to couple MT 306 and SVSM 304.

Additionally, Cdyn_max contributes to the dynamic component of Icc_max, e.g., where Icc_max=V*F*Cdyn_max+Leakage (where "V" stands for voltage, and "F" stands for frequency). In an embodiment, GT's Icc_max contribution to the full chip Icc_max is reduced when a package Icc_max limitation occurs. In one embodiment, GT's Icc_max is reduced for load line optimization (i.e., when a load line impedance is non-zero and non-negligible). To achieve these goals, some assumptions may be made, such as: Cdyn_max rarely occurs in work loads (non-synthetic and synthetic) and/or Cdyn_max may only occur when EUs, samplers, and L3$(s) are highly utilized (this occurrence is generally intermittent and difficult to sustain and because of the rarity and intermittency of occurrence, it is detectable and preventable across the window of concern (e.g., 200 ns to 1 μsec range)).

In an embodiment, Cdyn_max clamping would guarantee that the Cdyn_max(Bin) does not exceed a specified threshold (e.g., a specified percentage of Cdyn_max) by inserting bubbles in one or more EU's and/or in specified interface(s) within the samplers to at least temporarily quiet the GT system and/or in the EU pipe(s) depending on the level of threshold (or otherwise the amount of clamping that is to be guaranteed). Referring to FIG. 3, various bubble insertion points (also referred to as holds) are shown with the dotted arrows, according to some embodiments.

Figure 4:
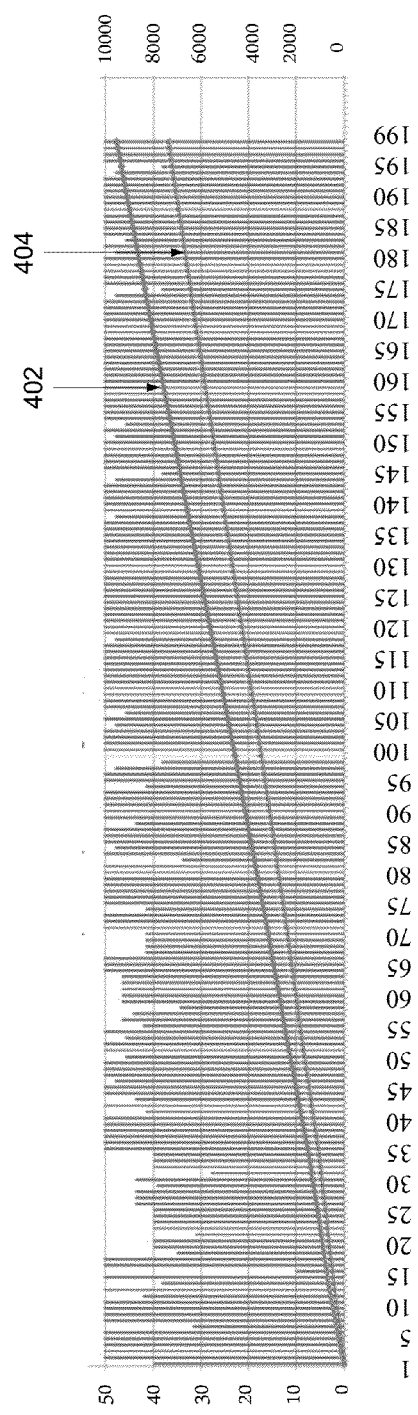
FIGS. 4 and 5 show graphs of Cdyn_max versus clock values for Cdyn_max without and with mitigation, respectively, in accordance with some embodiments.
Figure 5:
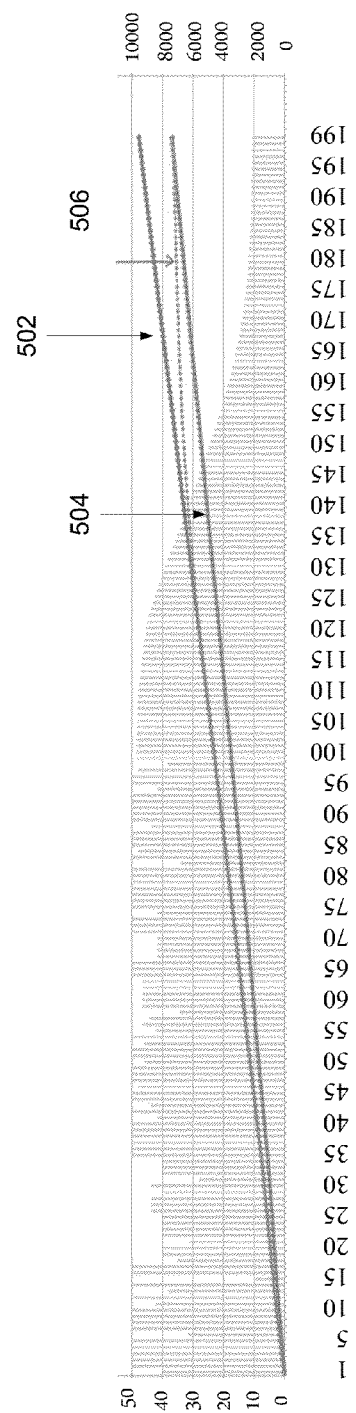

Some embodiments utilize one or more of the following input parameters: (1) a signal to enable the Cdyn_max clamping feature (e.g., it is only enabled if needed, and the "need" could be determined by the PCU 140 based on graphics logic V, F, and/or temperature as well as the V, F, and/or temperature for the processor core(s) and uncore, etc.); (2) window duration of concern, e.g., 200 ns up to 1 μsec; (3) the number of clocks that the window contains based on present graphics frequency (for example, a 1 μsec window would contain 1000 clocks for 1 GHz frequency and 500 clocks for 500 MHz); and/or (4) the level at which Cdyn_max needs to be clamped (for example, let the Cdyn_max be 50 nF, and then the request would be for clamping Cdyn_max at 40 nF as depicted in FIG. 4 or 5). The clamping level (threshold) may also be programmable (e.g., to support multiple thresholds).

In various embodiments, there could be six components for the graphics Cdyn_max tracking calculation including for example: (1) baseline which is a fixed cost for non-EU, non-sampler, and non-L3$; (2) EU_FPU0 (EU floating point unit 0); (3) EU_FPU1 (EU floating point unit 1, which may include EMS (Extended Math Pipe, e.g., to support transcendental instructions and reciprocal instructions)); (4) sampler main pipeline(s); (5) sampler fetch pipeline(s); and (6) L3$ (s). The utilization of the above components 2, 3, 4, 5, and 6 determines the Cdyn_max in this very coarse simplified model. This activity may be monitored by use of an "accumulated sum of weighted products" model. Other factors which influence Cdyn, such as voltage, may also be used to modulate the baseline Cdyn_max (such as for modeling bin split). Somewhere (e.g., half-way) through the window the value of the "accumulated sum of weighted products" may be evaluated (where the "accumulated sum of weighted products metric" is in units of nF). If a threshold has been met or exceeded, then a mitigation policy may be invoked to bring the accumulated metric value down to a target/needed level such that the Cdyn_max for that window has been sufficiently clamped.

As discussed above, mitigation may be initiated in response to reaching or exceeding a threshold. FIGS. 4 and 5 show graphs of Cdyn_max (in nF) vs. clocks (each clock equaling 1 ns for 1 GHz) for Cdyn_max without and with mitigation, respectively, in accordance with some embodiments. In the examples shown in FIGS. 4 and 5, the window duration is set to 200 ns (or 200 clocks at 1 Hz operation). In an embodiment, the minimum window duration can be less than 200 ns (e.g., 100 ns). The desired Cdyn_max threshold for the window may not to exceed 40 nF.

FIG. 4 shows the workload operating without a Cdyn_max Clamping feature. Line 402 shows that by the end of the 200 ns window, the average Cdyn_max of the window is about 48 nF, which is above the target 40 nF. Line 404 shows target Cdyn_max values by the end of the 200 ns clock window. Moreover, FIG. 5 demonstrates how the Cdyn_max clamping feature would operate: Half way through the window (at X-axis value of 100), "accumulated sum of weighted products" metric (line 502) is evaluated and compared to the target (line 504) at the midpoint in window. Because, in this example, the line 502 is above (i.e., with a greater magnitude) than line 504, the mitigation policy is invoked. Hence, bubbles may be inserted at key locations in one or more EUs and/or in (e.g., one or more interfaces of) the sampler logic which not only impact the sampler but also the EUs and the L3$.

Also, curve 506 shows the resulting behavior. At the end of the 200 ns window the average sustained Cdyn_max is less than 40 nF (line 506). An alternative approach would be to evaluate the "accumulated sum of weighted products metric" once every some number (e.g., 50) clock cycles independent of the window length, and then mitigating for the next same number (e.g., 50) cycles, if needed.

Figure 6:
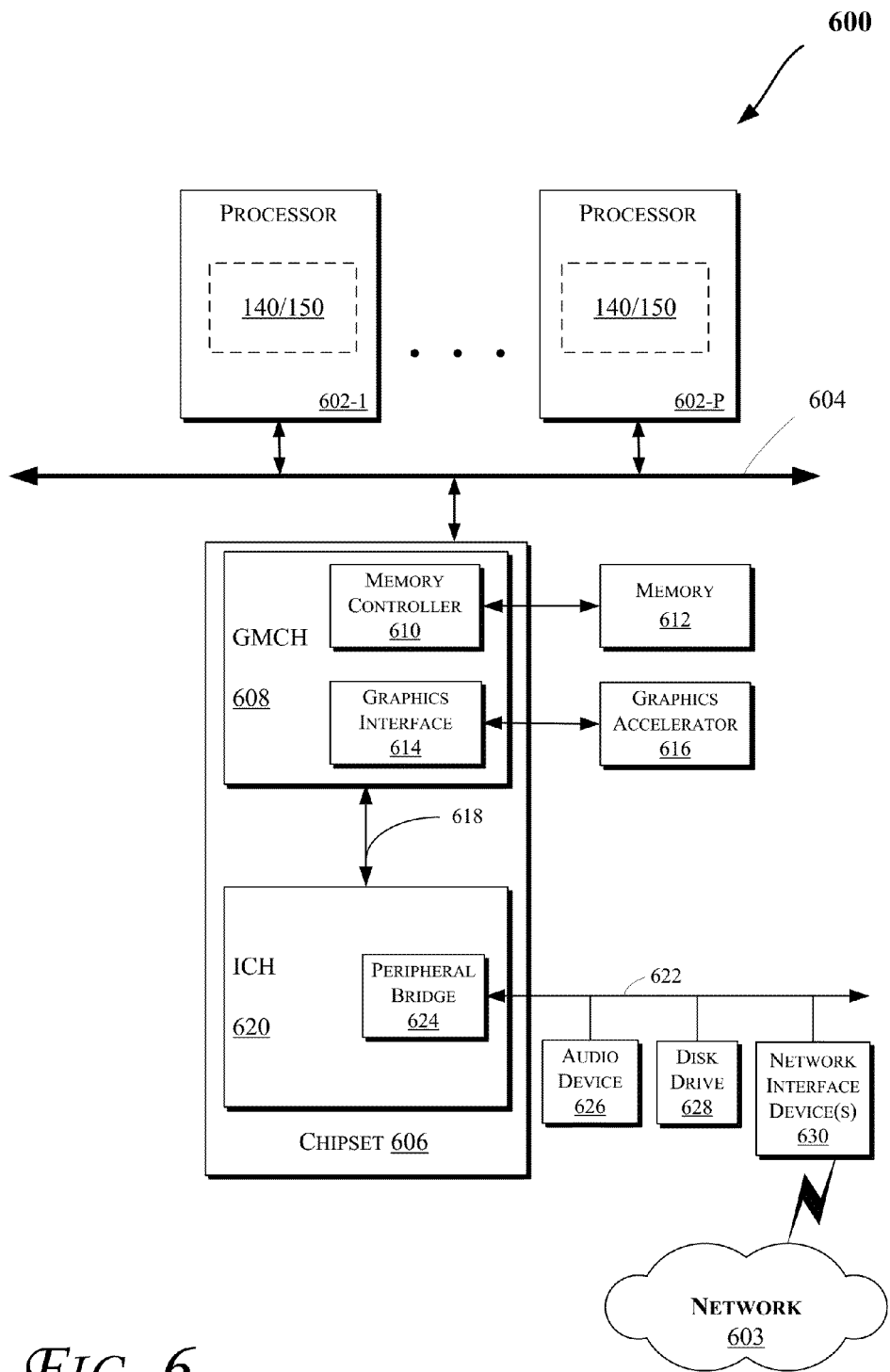

FIG. 6 illustrates a block diagram of a computing system 600 in accordance with an embodiment of the invention. The computing system 600 may include one or more central processing unit(s) (CPUs) or processors 602-1 through 602-P (which may be referred to herein as "processors 602" or "processor 602"). The processors 602 may communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. In some embodiments, one or more of the processors 602 may include one or more of the cores 106, logic 140, sensor(s) 150, of FIG. 1. Also, the operations discussed with reference to FIGS. 1-5 may be performed by one or more components of the system 600. For example, a voltage regulator (such as VR 130 of FIG. 1) may regulate voltage supplied to one or more components of FIG. 6 at the direction of logic 140.

A chipset 606 may also communicate with the interconnection network 604. The chipset 606 may include a graphics and memory control hub (GMCH) 608. The GMCH 608 may include a memory controller 610 that communicates with a memory 612. The memory 612 may store data, including sequences of instructions that are executed by the processor 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The GMCH 608 may also include a graphics interface 614 that communicates with a graphics accelerator 616. In one embodiment of the invention, the graphics interface 614 may communicate with the graphics accelerator 616 via an accelerated graphics port (AGP). In an embodiment of the invention, a display (such as a flat panel display, a cathode ray tube (CRT), a projection screen, etc.) may communicate with the graphics interface 614 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 618 may allow the GMCH 608 and an input/output control hub (ICH) 620 to communicate. The ICH 620 may provide an interface to I/O devices that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and one or more network interface device(s) 630 (which is in communication with the computer network 603). Other devices may communicate via the bus 622. Also, various components (such as the network interface device 630) may communicate with the GMCH 608 in some embodiments of the invention. In addition, the processor 602 and the GMCH 608 may be combined to form a single chip. Furthermore, the graphics accelerator 616 may be included within the GMCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 600 may be arranged in a point-to-point (PtP) configuration. For example, processors, memory, and/or input/output devices may be interconnected by a number of point-to-point interfaces.

Figure 7:
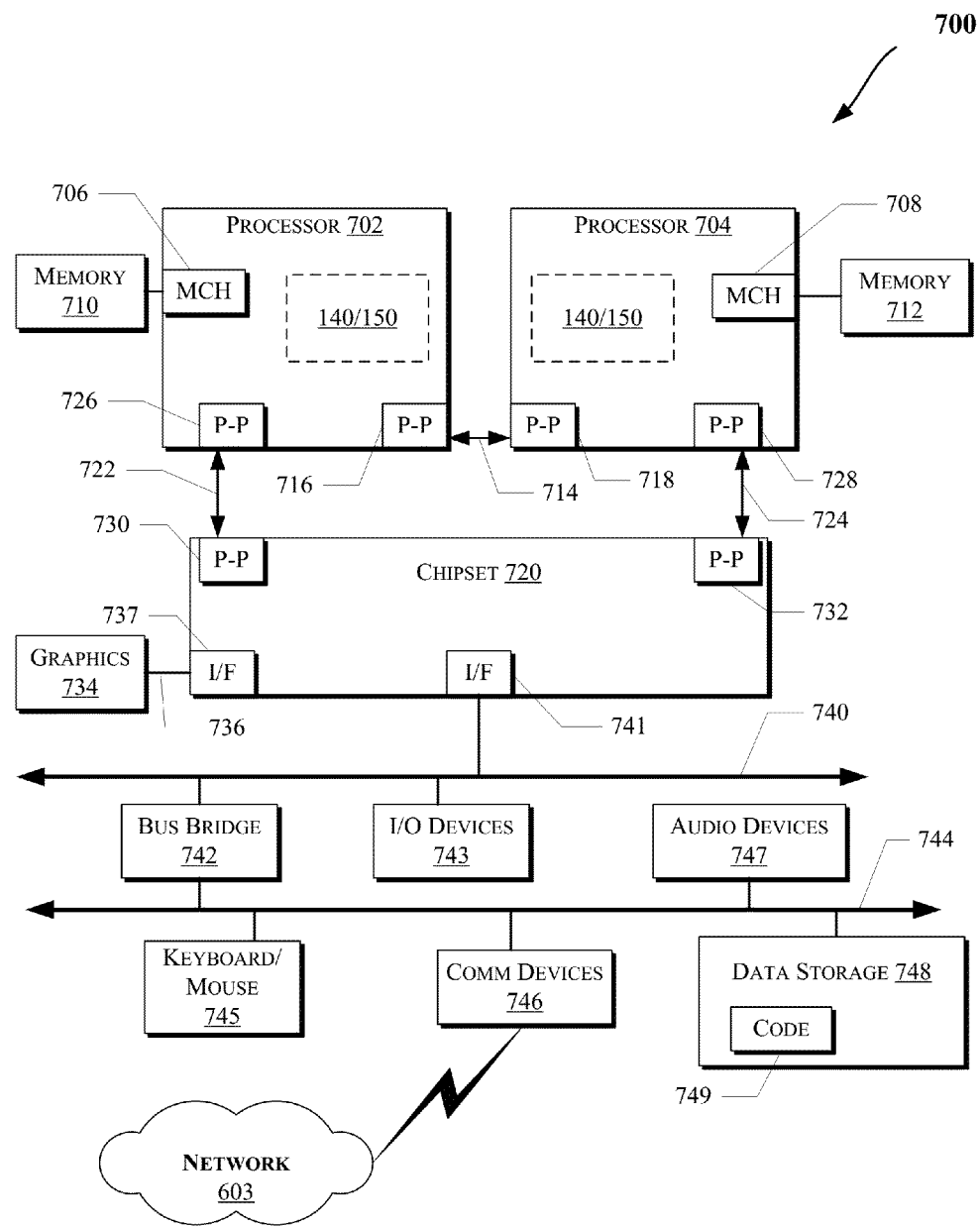

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700. For example, a voltage regulator (such as VR 130 of FIG. 1) may regulate voltage supplied to one or more components of FIG. 7.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6. Also, the processors 702 and 704 may include one or more of the cores 106, logic 140, and/or sensor(s) 150 of FIG. 1.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

In at least one embodiment, one or more operations discussed with reference to FIGS. 1-6 may be performed by the processors 702 or 704 and/or other components of the system 700 such as those communicating via a bus 740. Other embodiments of the invention, however, may exist in other circuits, logic units, or devices within the system 700 of FIG. 7. Furthermore, some embodiments of the invention may be distributed throughout several circuits, logic units, or devices illustrated in FIG. 7.

Chipset 720 may communicate with the bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
    logic, at least a portion of which is in hardware, to determine utilization values for a plurality of subsystems of a graphics logic;
    logic, at least a portion of which is in hardware, to determine a first capacitance value based on the determined utilization values; and
    logic, at least a portion of which is in hardware, to cause modification to a second capacitance value, corresponding to the graphics logic, based on the first capacitance value and the second capacitance value, wherein logic to determine the first capacitance value is to determine the first capacitance value based on a sum of products of the determined utilization values and one or more capacitance weight values plus a baseline.

2. The processor of claim 1, wherein the logic to determine the first capacitance value is to determine the first capacitance value based on one or more capacitance weight values that are to correspond to dynamic capacitance values corresponding to the second capacitance value.

3. The processor of claim 2, wherein the one or more capacitance weight values are to correspond to highest toggle and highest activity mode assumptions for the plurality of subsystems.

4. The processor of claim 1, wherein the plurality of subsystems are to comprise one or more of: an execution unit, a sampler logic, and a third level cache.

5. The processor of claim 4, wherein logic to cause modification to the second capacitance value is to cause modification to the second capacitance value through insertion of one or more bubbles in the execution unit or in one or more interfaces of the sampler logic to at least temporarily reduce execution of operations in the graphics logic.

6. The processor of claim 5, wherein logic to cause modification to the second capacitance value is to cause modification to the second capacitance value through insertion of one or more bubbles in the execution unit or the in one or more interfaces of the sampler logic to at least temporarily reduce execution of operations in the graphics logic depending on the level of the second capacitance value.

7. The processor of claim 4, further comprising logic to model a remainder of the graphics logic as a fixed component.

8. The processor of claim 1, wherein logic to determine the utilization values for the plurality of subsystems is to determine the utilization values during a time period, wherein the period of time is to comprise a plurality of clock cycles.

9. The processor of claim 8, wherein the time period is to be between 200 ns and 1 μsec.

10. The processor of claim 1, wherein the second capacitance value is to be a percentage of the second capacitance value.

11. The processor of claim 1, wherein the determined utilization values is to be based on information from one or more sensors.

12. The processor of claim 1, further comprising one or more sensors to detect variations, corresponding to components of the processor, in one or more of: temperature, operating frequency, operating voltage, operating current, dynamic capacitance, power consumption, or inter-core communication activity.

13. The processor of claim 1, wherein the graphics logic is to comprise one or more processor cores to perform graphics or general-purpose computational operations.

14. The processor of claim 1, wherein one or more of a plurality of subsystems, a voltage regulator, the logic to determine, the logic to cause modification, or memory are on a single integrated circuit die.

15. A method comprising:
    determining utilization values for a plurality of subsystems of a graphics logic;

determining a first capacitance value based on the determined utilization values; and causing modification to a second capacitance value, corresponding to the graphics logic, based on the first capacitance value and the second capacitance value, wherein determining the first capacitance value determines the first capacitance value based on a sum of products of the determined utilization values and one or more capacitance weight values plus a baseline.

16. The method of claim 15, further comprising causing modification to the second capacitance through insertion of one or more bubbles in one or more execution units of the plurality of subsystems or in one or more interfaces of a sampler logic of the plurality of subsystems to at least temporarily reduce execution of operations in the graphics logic.

17. The method of claim 15, further comprising detecting variations at one or more sensors, corresponding to components of the graphics logic, in one or more of: temperature, operating frequency, operating voltage, operating current, dynamic capacitance, power consumption, or inter-core communication activity.

18. A system comprising:
a processor having one or more processor cores;
memory to store data, corresponding to at least one frame of a scene, to be accessed by at least one of the one or more processor cores;
a display device to present the at least one frame of the scene;
the processor comprising:
logic, at least a portion of which is in hardware, to determine utilization values for a plurality of subsystems of a graphics logic;
logic, at least a portion of which is in hardware, to determine a first capacitance value based on the determined utilization values; and
logic, at least a portion of which is in hardware, to cause modification to a second capacitance value, corresponding to the graphics logic, based on the first capacitance value and the second capacitance value, wherein logic to determine the first capacitance value is to determine the first capacitance value based on a sum of products of the determined utilization values and one or more capacitance weight values plus a baseline.

19. The system of claim 18, wherein the logic to determine the first capacitance value is to determine the first capacitance value based on one or more capacitance weight values that are to correspond to dynamic capacitance values corresponding to the second capacitance value.

20. The system of claim 19, wherein the one or more capacitance weight values are to correspond to highest toggle and highest activity mode assumptions for the plurality of subsystems.

21. A non-transitory computer-readable medium comprising one or more instructions that when executed on a processor configure the processor to perform one or more operations to:
determine utilization values for a plurality of subsystems of a graphics logic;
determine a first capacitance value based on the determined utilization values; and
cause modification to a second capacitance value, corresponding to the graphics logic, based on the first capacitance value and the second capacitance value, wherein the processor is to perform one or more operations to determine the first capacitance value based on a sum of products of the determined utilization values and one or more capacitance weight values plus a baseline.

22. The non-transitory computer-readable medium of claim 21, further comprising one or more instructions that when executed on the processor configure the processor to perform one or more operations to cause modification to the second capacitance through insertion of one or more bubbles in one or more execution units of the plurality of subsystems or in one or more interfaces of a sampler logic of the plurality of subsystems to at least temporarily reduce execution of operations in the graphics logic.

23. The non-transitory computer-readable medium of claim 21, further comprising one or more instructions that when executed on the processor configure the processor to perform one or more operations to determine the first capacitance value based on one or more capacitance weight values correspond to dynamic capacitance values corresponding to the second capacitance value.

24. The non-transitory computer-readable medium of claim 23, wherein the one or more capacitance weight values are to correspond to highest toggle and highest activity mode assumptions for the plurality of subsystems.

25. The non-transitory computer-readable medium of claim 21, further comprising one or more instructions that when executed on the processor configure the processor to perform one or more operations to determine the utilization values during a time period, wherein the period of time comprises a plurality of clock cycles.

26. The non-transitory computer-readable medium of claim 21, further comprising one or more instructions that when executed on the processor configure the processor to perform one or more operations to determine variations at one or more sensors, corresponding to components of the graphics logic, in one or more of: temperature, operating frequency, operating voltage, operating current, dynamic capacitance, power consumption, or inter-core communication activity.

* * * * *